H. W. JONES.
PROCESS AND APPARATUS FOR CONCENTRATING ACIDS.
APPLICATION FILED NOV. 6, 1915.
1,183,207.
Patented May 16, 1916.
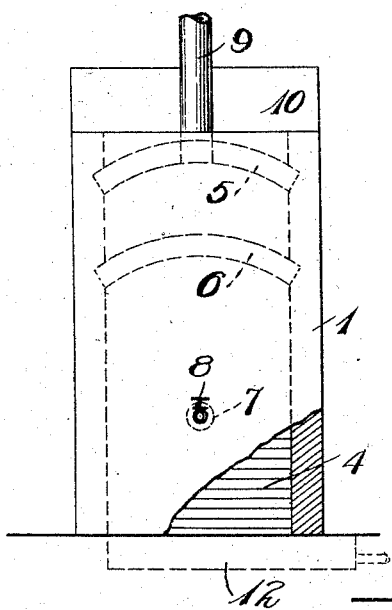
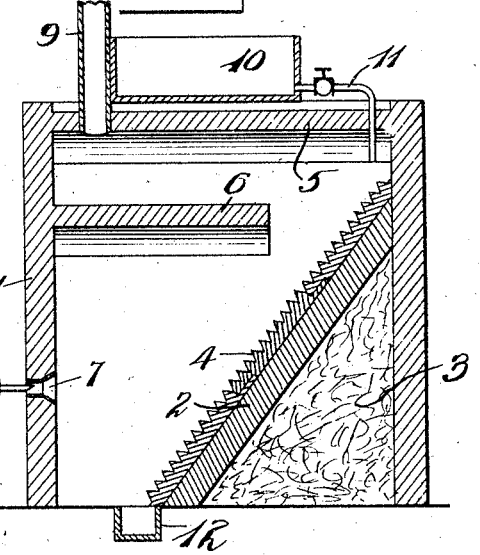
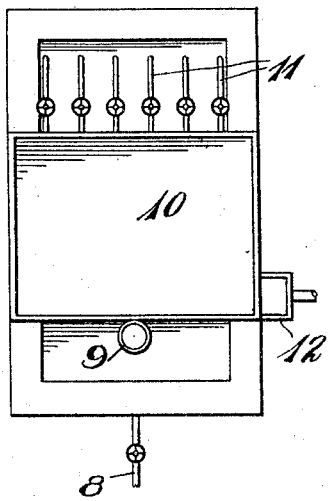
Inventor
HORACE W. JONES.
By his Attorneys
Pennie Davis Marvin

UNITED STATES PATENT OFFICE.

HORACE W. JONES, OF CHICAGO, ILLINOIS, ASSIGNOR TO ARMOUR FERTILIZER WORKS, OF UNION STOCK YARDS, CHICAGO, ILLINOIS, A CORPORATION OF NEW JERSEY.

PROCESS AND APPARATUS FOR CONCENTRATING ACIDS.

1,183,207.   Specification of Letters Patent.   Patented May 16, 1916.

Application filed November 6, 1915.   Serial No. 59,936.

*To all whom it may concern:*

Be it known that I, HORACE W. JONES, a citizen of the United States, residing at 4923 Lake Park avenue, Chicago, county of Cook, State of Illinois, have invented certain new and useful Improvements in Processes and Apparatus for Concentrating Acids; and I do hereby declare the following to be a full, clear, and exact description of the invention, such as will enable others skilled in the art to which it appertains to make and use the same.

My invention relates to the concentration of acids, such as sulfuric acid, phosphoric acid, etc., and it comprises both a novel method of evaporation and of concentration, and a novel apparatus therefor.

In the concentration of acids such as sulfuric acid, etc., by boiling, as practised in evaporating pans heated by direct flame from below, there is danger of overheating of the pan itself, as well as of the acid which it contains. The heat is transmitted through the pan to the acid so that the hottest part of the acid is where it comes in contact with the pan. As a result of this intense localized heating there is also danger of destruction of the pans by the acid as well as by the direct flame. It has also been heretofore proposed to concentrate the acids by forcing a heated gaseous current up through a tower through which the acid is flowing downward. In this procedure, the heated gases are rapidly cooled, because of the large latent heat of evaporation of the liquid, so that the acid is subjected to a high temperature only in the bottom of the tower, and evaporation by the cooler gases in the upper portion of the tower is correspondingly diminished. The partial saturation of the gases in their upward passage through the tower also exerts a limiting effect upon the evaporation and concentration of the acid in the upper portions of the tower. Also, with such methods of evaporation, power is required for forcing the heated gases through the tower and the acid therein, particularly in those towers where the gases are forced through a series of liquid seals at different levels. Proposals have also been made heretofore to effect the concentration of the acid by direct heat from above, a direct flame or current of highly heated gases being brought into immediate contact with the surface of the acid in the evaporating pans. Such direct heat against a stagnant body of acid, or against a body of considerable depth, is apt to cause local overheating at the surface and accompanying loss of acid, because the conduction of heat through a stagnant body of liquid is very slow.

The present invention relates to a novel apparatus and method for concentrating the acid according to which disadvantages such as those above noted are largely overcome or minimized, and according to which, moreover, the concentration is effected in a simple, rapid and continuous manner, well adapted for the production of concentrated acids for industrial purposes.

According to the present invention, the acid is caused to flow down over an irregular inclined surface, in the form of alternate pools and films, in such a manner that the acid is kept continually in motion, and the particles thereof undergoing continual re-arrangement, so that uniformity of temperature and composition is promoted, and so that fresh films are being continuously formed and presented for evaporation. At the same time, a current of highly heated gases is directed against the acid so flowing, in such a manner that the heated gases are caused to impinge upon the films of acid, and the gases thereby brought into most intimate contact therewith. The evaporated liquid is also continuously removed with the heated gases so that fresh amounts of the hot gases are being continuously brought into direct contact with the fresh films and surfaces of the acid. The arrangement of the inclined surface over which the acid flows, and of the current of highly heated gases, may also, with advantage, be such that the gases are discharged upwardly against the inclined surface, or against the lower portion thereof, so that they rise upwardly with respect thereto, whereby a counter-current action is obtained, and the hotter gases are brought into direct contact with the already partly concentrated acid nearer the bottom of the inclined surface.

The heated gases may be those of a direct flame which is directed against the acid, or those resulting from combustion processes, or those resulting from the heating of air or other gases in any suitable manner. Where a flame is used, it may be produced by the combustion of gases or of oil or even of solid fuel. Where the products of combustion contain dust or other solids or impurities, the acid may be contaminated therewith, but for some industrial purposes this slight contamination is not objectionable. Where waste heat is available in the form of products of combustion from pyrites burners or from industrial furnaces, these can be utilized as the heating gases.

I will now proceed to describe my invention more in detail with particular reference to the embodiment thereof illustrated in the accompanying drawings, in which—

Figure 1 shows, in central longitudinal vertical section, an apparatus embodying the invention, and in which the novel process of the invention can be practised; Fig. 2 is a front elevation thereof with parts broken away; and Fig. 3 is a plan view.

The apparatus illustrated comprises a tower or furnace 1, of refractory or other material adapted to resist the action of the heated gases and of the vapors from the acid, having therein an inclined wall 2 which may be supported below by any suitable filling material 3, and which supports the inclined surface 4 over which the acid flows.

The tower or furnace is provided with a top arch 5, and with a baffle arch 6 arranged to promote the upward circulation of the highly heated gases in contact with the acid. A suitable inlet 7 is provided for the hot gases, and, where a direct flame is desired, a gas or oil or other suitable burner 8 is also provided. From the top of the apparatus the gases, together with the evaporated liquid, escape through the flue 9 either to the atmosphere or to a condenser or washing apparatus or other point of further treatment or use.

A feed tank 10 is provided for the acid to be concentrated, and from this tank the acid flows through the feed pipes 11 having suitable regulating valves therein, to the inclined surface 4. The evaporated acid from the bottom of the inclined surface 4 is caught in the tank 12 and can be led to any suitable place of storage or of further treatment. The acid can of course be returned and again passed through the apparatus for further concentration. The inclined surface 4 is of an irregular nature, and, in the embodiment of the invention illustrated, is made up of horizontally corrugated or indented metal or other material. The liquid to be concentrated is caused to flow down this corrugated surface and in doing so forms alternate pools and films of liquid from which evaporation thereof takes place, with resulting concentration.

The apparatus illustrated is designed particularly for the concentration of sulfuric and of phosphoric acid, but it will be understood that it is adapted for the concentration of other liquids of a similar nature, in a similar manner. For the concentration of sulfuric acid, the inclined surface may be made of several sheets of cast iron, suitably joined together, or of other suitable material adapted to resist the action of the acid. Similarly, for phosphoric acid, the inclined surface may be made of earthenware or brick or other acid-resistant material.

In the operation of the apparatus and the practising of the novel method of concentrating therein, the hot air, gas, or flame, is discharged into the apparatus at 7 and impinges on the evaporating surfaces, after which it is discharged together with the vapors from the acid through the escape-pipe or flue 9 to the atmosphere or to other points of treatment or use.

Because of the continuous re-arrangement of the particles of the acid in its passage down over the inclined surface, in the form of alternate pools and films, uniformity of temperature and of composition is promoted, as well as evaporation from the fresh films and surfaces of acid which are continually being formed. Local overheating of the acid at its exposed surfaces is thus prevented or minimized, because of the constantly changing character of the film and pool surfaces. Since the phenomenon of evaporation is restricted to the exterior free surface of the liquid, the continual re-arrangement of the liquid and the formation of fresh surfaces causes the evaporation to take place, in a particularly advantageous manner.

Owing to the fact that the inclined surface itself is protected by the acid flowing over it from direct contact with the flame or other heating gases, danger of overheating is prevented or diminished. It will also be seen that the acid is fed to the apparatus, and passes down therethrough, by gravity, while the highly heated gases enter the apparatus near its lower portion and pass upwardly therethrough in contact with the acid and then escape from the top of the apparatus without meeting with direct resistance. Accordingly, no external application of power is necessary other than that required for supplying the acid to be evaporated, and for supplying the heating gases.

What I claim is:

1. The method of concentrating acids which comprises causing the acid to flow down over an irregular inclined surface, in the form of alternate pools and films, and directing a current of highly heated gases against the acid so flowing, whereby the hot gases are caused to impinge upon the acid and brought into intimate contact therewith, and the evaporated liquid is continuously removed, and whereby the acid is kept in motion and fresh surfaces thereof continuously exposed to the hot gases; substantially as described.

2. An apparatus for concentrating acids comprising an irregular inclined surface constructed and arranged to cause the acid to flow down thereover in the form of alternate pools and films, means for feeding the acid to be concentrated to said surface, and means for directing the current of highly heated gases against the acid flowing over said surface, to effect concentration of the same; substantially as described.

3. An apparatus for concentrating acids comprising an inclosed casing or chamber having therein an irregular inclined surface constructed and arranged to cause the acid to flow down thereover in the form of alternating pools and films, means for feeding the acids to be concentrated to said surface, an inlet for a current of highly heated gases through said casing or chamber opposite the lower portion of said inclined surface for directing said gases against the acid flowing over said surface, an outlet for said gases and the evaporated liquid from the top of the casing or chamber, and a baffle arranged within the casing or chamber for causing the gases to pass upwardly in contact with the acid flowing over said inclined surface; substantially as described.

In testimony whereof I affix my signature.

HORACE W. JONES.